（12）United States Patent
Nied et al.

(10) Patent No.: US 11,731,139 B2
(45) Date of Patent: Aug. 22, 2023

(54) MACHINE HAVING A CANTILEVER-MOUNTED ROTOR

(71) Applicants: Netzsch Trockenmahltechnik GmbH, Selb (DE); Roland Nied, Bonstetten (DE)

(72) Inventors: Roland Nied, Bonstetten (DE); Lars-Peter Weiland, Schönwald (DE)

(73) Assignee: Netzsch Trockenmahltechnik GMBH, Selb (DE)

( * ) Notice: Subject to any disclaimer, the term of this patent is extended or adjusted under 35 U.S.C. 154(b) by 622 days.

(21) Appl. No.: 14/576,407

(22) Filed: Dec. 19, 2014

(65) Prior Publication Data
US 2015/0174585 A1 Jun. 25, 2015

(30) Foreign Application Priority Data
Dec. 20, 2013 (DE) .......................... 102013021757.1

(51) Int. Cl.
*B02C 17/24* (2006.01)
*B07B 7/083* (2006.01)
(Continued)

(52) U.S. Cl.
CPC .............. *B02C 17/24* (2013.01); *B02C 17/02* (2013.01); *B02C 17/16* (2013.01); *B02C 17/181* (2013.01); *B02C 17/184* (2013.01); *B02C 17/1835* (2013.01); *B02C 17/1875* (2013.01); *B02C 17/1885* (2013.01); *B07B 7/083* (2013.01); *B07B 9/00* (2013.01); *F16H 35/00* (2013.01); *Y10T 74/18552* (2015.01)

(58) Field of Classification Search
CPC ......... B02C 17/02; B02C 17/16; B02C 17/24; B02C 17/181; B02C 17/1875; B02C 17/1885; B07B 7/083; B07B 9/00; F16H 35/00; Y10T 74/18552
USPC ........................................................... 241/51
See application file for complete search history.

(56) References Cited

U.S. PATENT DOCUMENTS 3,275,140 A * 9/1966 Rasmussen ............. B07B 4/025
209/139.2
3,540,664 A * 11/1970 Adams .................... B02C 17/02
241/73
(Continued)

FOREIGN PATENT DOCUMENTS

EP 0249879 * 11/1987
EP 0504836 * 9/1992
GB 1302583 * 1/1973

*Primary Examiner* — Shelley M Self
*Assistant Examiner* — Smith Oberto Bapthelus
(74) *Attorney, Agent, or Firm* — Mandelbaum Silfin Economou LLP (57) ABSTRACT

Machine having a rotor which is mounted in a cantilevered fashion on a bearing and has a rotational axis along which a free, subsequently non-mounted rotor end runs starting from the bearing, the rotor end having a rotor end side which is spaced apart from a fixed rotor opposing side by a gap, and which, during operation of the machine when the rotor is rotating, is deflected with respect to the rotational axis as a result of imbalance of the free, non-mounted rotor end, or as a result of externally applied forces, wherein the rotor end side is curved or beveled so as to drop away at least in its end region towards its edge and in a direction towards the bearing.

16 Claims, 8 Drawing Sheets

(51) Int. Cl.
*B02C 17/16* (2006.01)
*B02C 17/18* (2006.01)
*B02C 17/02* (2006.01)
*B07B 9/00* (2006.01)
*F16H 35/00* (2006.01)

(56) References Cited

U.S. PATENT DOCUMENTS

| | | | | |
|---|---|---|---|---|
| 4,121,776 A * | 10/1978 | Pujol | | B02C 17/16 241/46.11 |
| 4,227,816 A * | 10/1980 | Hold | | B01F 7/00816 366/99 |
| 4,300,842 A * | 11/1981 | Hold | | F16J 15/28 366/99 |
| 4,805,841 A * | 2/1989 | Pausch | | B02C 17/205 241/171 |
| 5,120,431 A * | 6/1992 | Cordonnier | | B07B 7/083 209/135 |
| 5,133,508 A * | 7/1992 | Stehr | | B02C 17/16 241/171 |
| 5,333,804 A * | 8/1994 | Liebert | | B02C 17/16 241/172 |
| 5,379,952 A * | 1/1995 | Geiger | | B02C 17/16 241/172 |
| 5,566,896 A * | 10/1996 | Stehr | | B02C 17/161 241/171 |
| 5,570,846 A * | 11/1996 | Stehr | | B02C 17/16 241/171 |
| 5,620,147 A * | 4/1997 | Newton | | B02C 17/16 241/171 |
| 5,624,080 A * | 4/1997 | Stehr | | B02C 17/161 241/171 |
| 5,797,550 A * | 8/1998 | Woodall | | B02C 17/16 241/171 |
| 5,853,132 A * | 12/1998 | Tsuji | | B02C 17/16 241/172 |
| 5,856,992 A * | 1/1999 | Karube | | F04D 29/102 372/58 |
| 5,882,246 A * | 3/1999 | Inkyo | | B02C 17/16 241/171 |
| 7,270,025 B2 * | 9/2007 | Niglov | | B06B 1/166 74/61 |
| 8,002,213 B2 * | 8/2011 | Stehr | | B02C 17/163 241/171 |
| 8,028,943 B2 * | 10/2011 | Harbs | | B02C 17/161 241/171 |
| 8,931,722 B2 * | 1/2015 | Lessard | | B02C 17/24 241/101.2 |
| 9,022,222 B2 * | 5/2015 | Devroe | | B07B 4/04 209/139.1 |
| 2003/0116663 A1 * | 6/2003 | Durr | | B02C 17/16 241/46.17 |
| 2004/0021021 A1 * | 2/2004 | Ishikawa | | B02C 17/16 241/172 |
| 2004/0182185 A1 * | 9/2004 | Niglov | | B06B 1/166 74/87 |
| 2006/0001939 A1 * | 1/2006 | Lee | | F16C 17/026 359/200.5 |
| 2009/0072060 A1 * | 3/2009 | Pausch | | B02C 17/161 241/171 |
| 2013/0264402 A1 * | 10/2013 | Pausch | | B02C 17/16 241/79 |
| 2015/0174585 A1 * | 6/2015 | Nied | | B07B 7/083 241/51 |
| 2016/0107163 A1 * | 4/2016 | Pausch | | B02C 17/161 241/30 |
| 2016/0271616 A1 * | 9/2016 | Enderle | | B02C 17/16 |

* cited by examiner

MACHINE HAVING A CANTILEVER-MOUNTED ROTOR

BACKGROUND OF THE INVENTION

The present invention relates to a machine having a rotor which is mounted in a cantilevered fashion on a bearing and has a rotational axis along which, next to the mounting at the bearing, there is a free, subsequently non-mounted rotor end which has a rotor end side which is spaced apart from a fixed rotor opposing side by a gap, according to the preamble of Claim 1.

In many machines and apparatuses in mechanical process engineering there is an objective to seal the free rotor end side at a free rotor end of a cantilever-mounted rotor with respect to a rotor opposing side, which is, for example, part of a fixed housing in which the rotor is accommodated. For this purpose, a plane-parallel gap with tight tolerances is usually formed between the rotor and the housing as a stator, i.e. between the rotor end side and the rotor opposing side, which gap is preferably rinsed with a gaseous fluid. This gap forms a contactless seal between a working space or processing space contained in the housing and a product discharge from the housing. There are usually, but not necessarily, drive devices for rotationally driving the rotor, assigned in the region of the bearing.

In the example of an air classifier with a bladed, rotating classifier wheel as a free rotor end of the cantilever-mounted rotor or as part thereof with, at any rate, the free rotor end side, the gap has, in particular, the function that no unclassified feedstock can enter a product discharge on the rotor opposing side, through which product discharge the separated fine material can exit the working space in which classification is carried out.

In a further example of an agitator bead mill which is operated in a dry state, the objective is to separate grinding bodies at the discharge of the ground material stream and to retain them in the grinding space or processing space. For this purpose, the free rotor end of the rotor contains a cantilever-mounted agitator shaft with a grinding-body separating device which is in turn bladed and which contains the free rotor end side which forms, with the rotor opposing side, the gap with respect to the housing part which lies opposite and which has the product discharge on the rotor opposing side.

Figure 8:
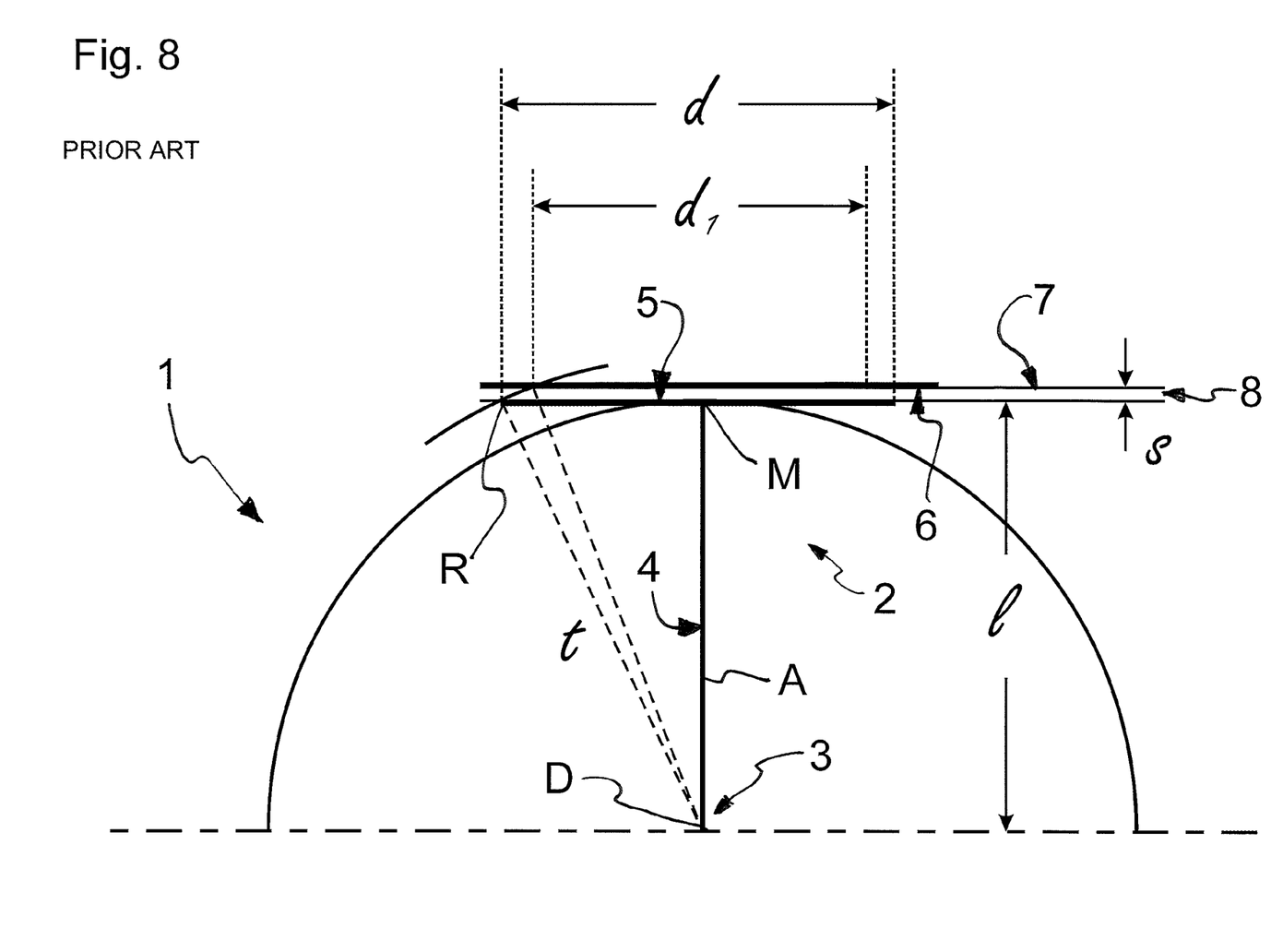
FIG. 8 shows a schematic illustration of the prior art of a machine having a cantilever-mounted rotor.

A machine 1 with its components and the geometrical relationships thereof is illustrated in a purely schematic and exemplary fashion as prior art of this type in FIG. 8. A rotor 2 of the machine 1 is cantilever-mounted on a bearing 3 and has a free rotor end 4 which terminates with a rotor end side 5 which has a diameter d. The free length l of the free rotor end 4 is defined from the bearing 3 up to the center M of the rotor end side 5. Compared to the rotor end side 5, a fixed rotor opposing side 6 is provided as part of a housing 7, which can also be referred to as a stator. A gap 8 having a gap width s, which cannot be selected to be of any small size, as is desirable, is formed between the rotor end side 5 and the rotor opposing side 6, which are plane-parallel when the rotor 2 is stationary. In addition, the size of a purging gas volume flow which is unused per se also increases with the size of the gap 8.

During operation, the free rotor end 4 will experience deflections about its center of rotation D on the bearing 3 owing to unavoidable imbalance, for example due to the formation of deposits and wear. If the free rotor end 4 of the rotor 2, if appropriate including a rotor body which is secured thereon and which then contains the rotor end side 5, is considered to be flexurally rigid with the length l, it is possible to calculate the dimension of the deflection, at which the edge R of the rotor end side 5 of the free rotor end 4 runs with its diameter d against the rotor opposing side 6 of the housing or stator 7. Referring to the schematic illustration of the positions of the individual elements and variables and the relationships between them:

l: length of the free rotor end 4 from the bearing 3 up to the center of the rotor end side when the rotor 2 is stationary [mm]

d: diameter of the rotor end side 5 at the free rotor end 4 [mm]

t: effective length of the free rotor end 4 from the bearing 3 or center of rotation D to the edge R of the rotor end side 5 [mm], The following applies to FIG. 8:

$$t = \sqrt{l^2 + \left(\frac{d}{2}\right)^2} \tag{1}$$

In addition, s: is the gap width between the rotor end side 5 of the free rotor end 4 and the rotor opposing side 6 of the fixed housing 7 [mm] with the result that the effective diameter $d_1$ with which the edge R of the rotor end side 5 at the free rotor end 4 touches the stationary rotor opposing side 6, which can be, for example, a washer, becomes approximately $$d_1 \approx \sqrt{t^2 - (l+s)^2} \tag{2}$$

which means, assuming the following exemplary dimensions:

l=850 mm
d=238 mm
s=0.5 mm
t=858.3 mm
$d_1$=230.9 mm, that the edge R of the rotor end side 5 at the free rotor end 4, such as, for example, of a shaft, runs up against the rotor opposing side 6 of the housing 7 given an available gap of 0.5 mm with a deflection by approximately +/−3.5 mm, as is apparent from $(d-d_1)/2$.

If the maximum occurring deflection of a given rotor is determined, it is possible in this way to determine the minimum gap dimension which can be implemented in practice given in plane-parallel configurations of the rotor end side and rotor opposing side, in order to ensure reliable running of the rotor. Thermal expansion additionally has to be taken into account where appropriate.

SUMMARY OF THE INVENTION

The present invention has achieved its objective of preventing a free rotor end of a cantilever-mounted rotor of a machine from running up against an opposing side given deflections of the free rotor end in the rotational mode of the rotor.

This objective is achieved with a machine according to Claim 1.

According to the invention, accordingly a machine is provided having a rotor which is mounted in a cantilevered fashion on a bearing and has a rotational axis along which a free, subsequently non-mounted rotor end runs starting from the bearing, said rotor end having a rotor end side which is spaced apart from a fixed rotor opposing side by a gap, and which rotor end, during operation of the machine when the rotor is rotating, is deflected with respect to the rotational axis as a result of imbalance of the cantilever-mounted rotor, in particular of the free, non-mounted rotor end, or as a result of externally applied forces, wherein the rotor end side is curved or beveled so as to drop away at least in its end region towards its edge and in the direction towards the bearing.

Imbalance of the cantilever-mounted rotor, in particular of the free, non-mounted rotor end can be present, on the one hand, basically due to the design, but also can arise during operation such as, for example, as a result of deposits forming in particular on the free, non-mounted rotor end and wear, in particular of the free, non-mounted rotor end, but also in the axial profile of the cantilever-mounted rotor.

The term externally applied forces is to be understood as meaning forces which act, for example as the result of the impacting of bodies such as, for example, grinding bodies or the temporary pressing of further machine components such as, inter alia, brake calipers or sliding contacts, against the cantilever-mounted rotor and, in particular, the free non-mounted rotor end on the cantilever-mounted rotor and, in particular, the free non-mounted rotor end and generate a deflection of the cantilever-mounted rotor and, in particular, of the free non-mounted rotor end. Basically, these are cases in which deflection of the cantilever-mounted rotor and, in particular, of the free non-mounted rotor end occurs with respect to the rotational axis of the cantilever-mounted rotor with the result that the free non-mounted rotor end is deflected with respect to the rotational axis and, depending on the size of this deflection owing to its radial extent and the dimensions of the gap, with respect to which it is to be kept as narrow as possible, for example in the case of a sealing gap, it can, at any rate, come into contact at its free end of the rotor end side with the rotor opposing side, which can lead to damage or even failure of the machine.

It is preferred if the rotor opposing side is a component of a housing.

In a further preferred configuration it is possible to provide that the rotor opposing side contains a material outlet opening opposite the rotor end side, and that the gap between the rotor end side and the rotor opposing side in the surroundings of the material outlet opening is a sealing gap.

In addition, it can preferably be provided that the rotor end side is embodied in the form of a frustum, cone or spherical cap.

Further preferred embodiments comprise the fact that the rotor opposing side is shaped analogous to the rotor end side in such a way, that the gap has at least essentially a constant width in particular even when the non-mounted, free rotor end is deflected with respect to the rotational axis during operation of the machine when the rotor is rotating, as a result of imbalance of the cantilever-mounted rotor, in particular of the free, non-mounted rotor end, or as a result of externally applied forces, or that the gap has a greater width at the edge than at the center of the rotor end side when the rotor is stationary.

Alternatively, it can preferably be provided that the rotor end side is embodied in a convexly spherical fashion, that when the rotor is stationary the free rotor end has a free axial length l measured from the bearing up to the center of the rotor end side, and that the convexly spherical rotor end side has a radius which is equal to the free axial length l of the free rotor end, or that the rotor end side is embodied in a convexly spherical fashion, and that the convexly spherical rotor end side has a smaller radius at the edge than in the center.

The above variants can preferably be embodied further in that the rotor opposing side lying opposite the rotor end side is embodied in a concavely spherical fashion. This configuration can, in addition, be developed as a result of the fact that when the rotor is stationary, the free rotor end has a free axial length l measured from the bearing up to the center of the rotor end side, and that the concavely spherical rotor opposing side has a radius which, measured at the center of the rotor end side when the rotor is stationary, is equal to the free axial length l plus the width s of the gap, or that when the rotor is stationary the free rotor end has a free axial length l measured from the bearing up to the center of the rotor end side, and that the radius of the concavely spherical rotor opposing side is larger, measured at the center of the rotor end side when the rotor is stationary, than the free axial length l plus the width s of the gap, at least compared to an edge region of the rotor end side.

Another preferred embodiment is that the said machine is an air classifier, that the rotor contains a bladed classifier wheel, and that the classifier wheel is formed or arranged at the free rotor end and contains the rotor end side.

Alternatively it can preferably be provided that said machine is a mill, in particular an agitator bead mill, that the rotor contains a separating device, in particular a grinding-body separating device and/or a bladed rotor body, and that the separating device or grinding-body separating device or the bladed rotor body is formed or arranged at the free rotor end and contains the rotor end side.

Furthermore, it is preferred if when the rotor is stationary the gap has, when measured at the center of the rotor end side, a width of less than or equal to 1 mm, in particular of less than or equal to 0.5 mm.

It is also preferred if devices for rinsing the gap, in particular the sealing gap, with a gaseous fluid are included.

Further preferred and/or advantageous embodiments of the invention and their individual aspects can be found in combinations of the dependent claims and in the entirety of the present application documents.

DESCRIPTION OF THE DRAWINGS

The invention will be explained in more detail below merely by way of example by means of exemplary embodiments and with reference to the drawing, in which.

DESCRIPTION OF THE PREFERRED EMBODIMENT

The invention is explained in more detail merely by way of example by means of the exemplary embodiments and application embodiments described below and illustrated in the drawings, i.e. the invention is not restricted to these exemplary embodiments and application embodiments. Method features and device features respectively also emerge from the descriptions of devices and methods in an analogous fashion.

Individual features which are specified and/or illustrated in relation to a specific exemplary embodiment are not restricted to this exemplary embodiment or the combination with the other features of this exemplary embodiment but rather can be combined within the scope of what is technically possible with any other variants, even if they are not treated separately in the present documents.

Identical reference symbols in the individual figures and illustrations of the drawing denote identical or similar or identically acting or similarly acting components. Such features which are not provided with reference symbols also become clear from the illustrations in the drawing, irrespective of whether or not such features are described below. On the other hand, features which are contained in the present description, but are not visible or illustrated in the drawing, are also readily understandable to a person skilled in the art.

Figure 1:
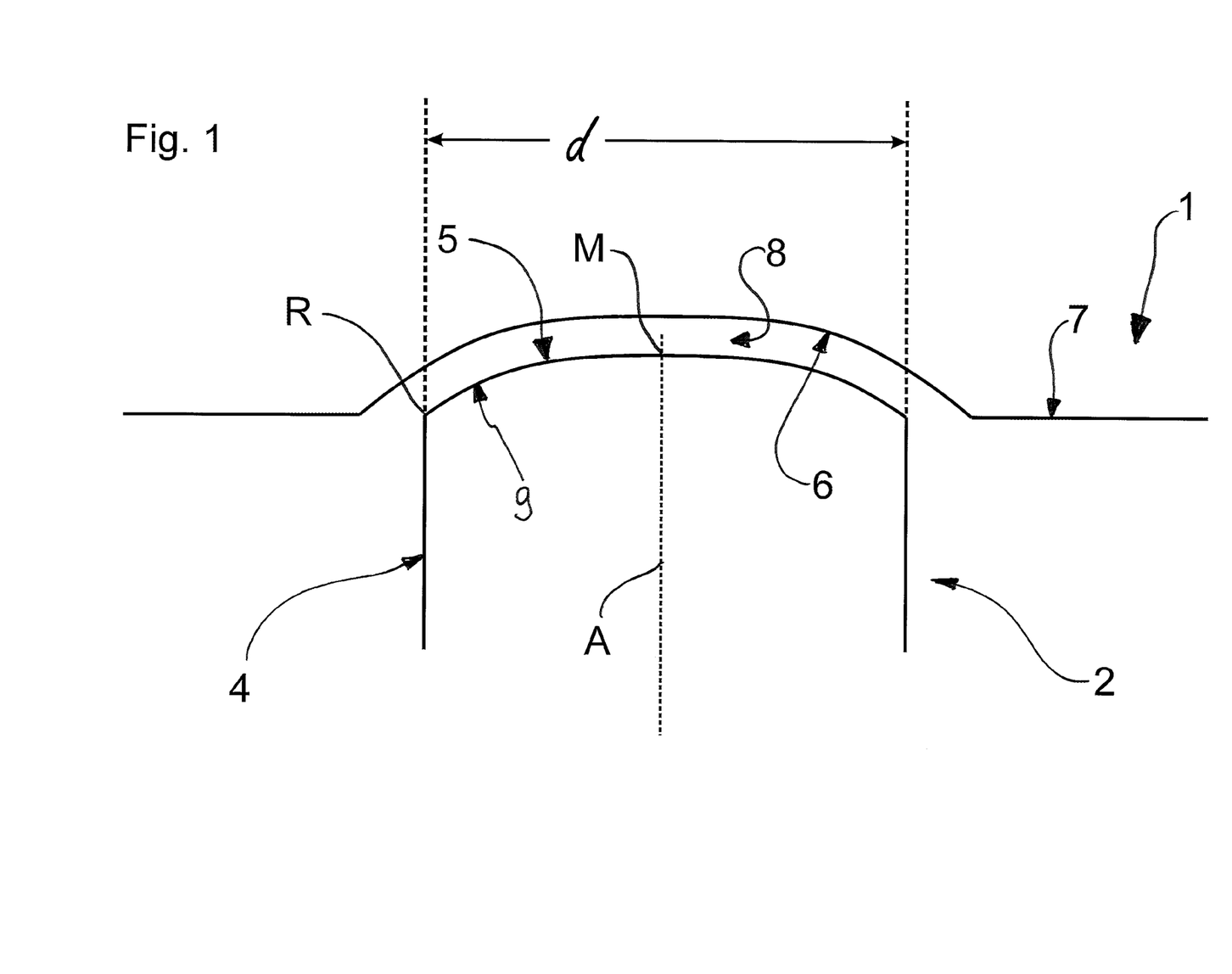
FIG. 1 shows a schematic sectional view of a detail of a first exemplary embodiment of a machine having a cantilever-mounted rotor.

FIG. 1 illustrates, by way of example, a schematic sectional view of a detail of a first exemplary embodiment of a machine 1 having a cantilever-mounted rotor 2. The rotor 2 has a rotational axis A and is mounted in a cantilevered fashion on a bearing 3, from which a free, subsequently non-mounted rotor end 4 is defined along the rotational axis A. The length l of the free rotor end 4 starts from the center of rotation determined by the bearing 3 and extends as far as the rotor end side 5 which terminates the free rotor end 4 of the rotor 2 opposite the bearing 3 and has a diameter d. During operation, the free rotor end 4, which rotates correspondingly when the rotor 2 rotates, will experience deflections with respect to the rotational axis A, or in other words, about its center of rotation D (cf. FIG. 8) at the bearing 3 (cf. FIG. 8) as a result of unavoidable imbalance of the cantilever-mounted rotor 2 in general and of the free non-mounted rotor end 4 which rotates along correspondingly, for example owing to the formation of deposits and wear.

Such deflections can also occur alternatively or additionally during operation as a result of externally applied forces which are forces which act, for example, as a result of the impacting of bodies, such as, for example, moving grinding bodies or the temporary pressing of further machine components such as, inter alia, brake jaws or sliding contacts, against the cantilever-mounted rotor 2 and, in particular, the free non-mounted rotor end 4 on the cantilever-mounted rotor 2 and, in particular, the free non-mounted rotor end 4, and generate a deflection of the cantilever-mounted rotor 2 and, in particular of the free non-mounted rotor end 4. Basically, these are cases in which deflection of the cantilever-mounted rotor 2 and, in particular, of the free non-mounted rotor end 4 occur with respect to the rotational axis A of the cantilever-mounted rotor 2, with the result that the free non-mounted rotor end 4 is deflected with respect to the rotational axis A.

Opposite the rotor end side 5 there is a fixed rotor opposing side 6 of a housing 7 which therefore constitutes a stator with respect to the rotor 2. Between the rotor end side 5 and the rotor opposing side 6 there is a gap 8. As can be clearly seen in FIG. 1, the rotor end side 5 is, when viewed from its center M, curved or beveled in an edge region 9 so as to drop away to its edge R. This curved or beveled shape can also be formed over the entire radius, i.e. from the center M to the edge R of the rotor end side 5. What is significant is that, as it were, the edge R of the rotor end side 5 is recessed in the direction towards the bearing 3 of the rotor 2. As a result, a free space for the edge R of the rotor end side 5 is provided in a skillful and simple as well as reliable way if the free rotor end 4 experiences deflections about its center of rotation D at the bearing 3 owing to unavoidable imbalance, for example, as a result of the formation of deposits and wear during the operation of the rotor 2.

That is to say, depending on the size of the operationally induced deflection of the cantilever-mounted rotor 2 and, in particular, of the free non-mounted rotor end 4 owing to the radial extent of the latter and the dimensions of the gap 8, with respect to which it is assumed that it is to be kept as narrow as possible such as, for example, in the case of a sealing gap, at any rate the free non-mounted rotor end 4 can enter into contact at its free end R of the rotor end side 5 with the rotor opposing side 6, which can lead to damage possibly culminating in failure of the machine 1.

In this first exemplary embodiment, the rotor end side 5 is embodied in the form of a frustum or spherical cap, with the result that the gap 8 can also be referred to as spherical-cap-shaped. The rotor opposing side 6 is shaped in a way analogous to the rotor end side 5, with the result that the gap 8 has at least essentially a constant width s, as it is defined according to FIG. 8. The rotor end side 5 and the rotor opposing side 6 can also be conical or convex and concave, respectively, as can be seen and is implemented, in particular, in the second exemplary embodiment according to FIG. 2.

Figure 2:
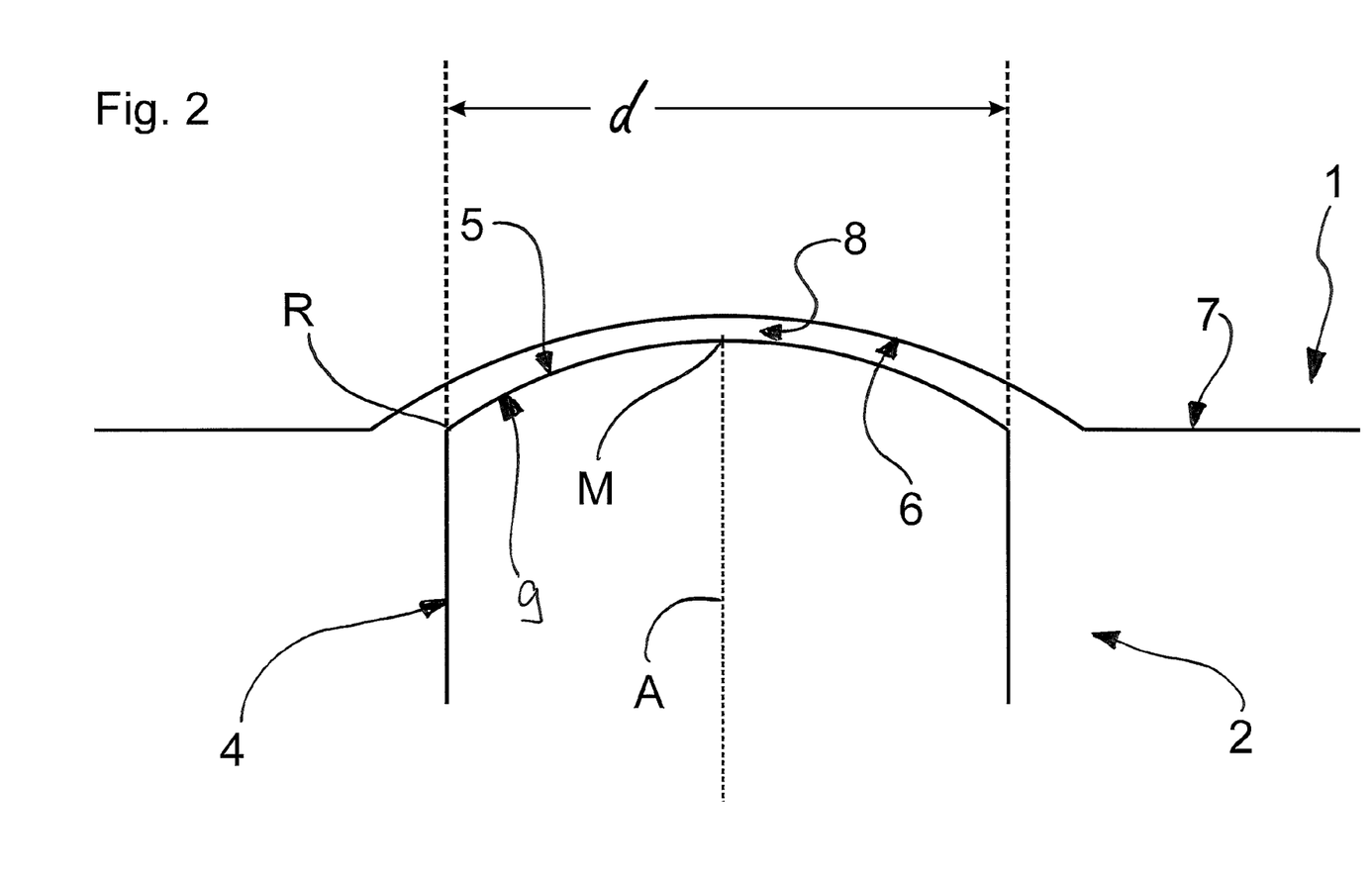
FIG. 2 shows a schematic sectional view of a detail of a second exemplary embodiment of a machine having a cantilever-mounted rotor.

In the second exemplary embodiment of a machine 1, which is shown schematically in section in FIG. 2 and which has a cantilever-mounted rotor 2, identical components to those in the first exemplary embodiment according to FIG. 1 are provided with the same reference symbols and, insofar as they are identical, are not described once more with respect to FIG. 2 in order to avoid unnecessary repetitions. In this respect, reference is made completely to the description relating to FIG. 1, and details of the second exemplary embodiment according to FIG. 2 are explained below only insofar as and to the extent that they differ from the first exemplary embodiment according to FIG. 1.

In the second exemplary embodiment according to FIG. 2, the rotor end side 5 is embodied in a convexly spherical fashion. When the rotor 2 is stationary, the free rotor end 4 has a free axial length l, measured from the bearing 3 up to the center M of the rotor end side 5, as is illustrated in FIG. 8. The radius of the convexly spherical rotor end side 5 is identical to the free axial length l of the free rotor end 4 (cf. FIG. 8). Instead of a constant radius over the entire surface of the rotor end side 5, it is also possible to provide that the convexly spherical rotor end side 5 has a smaller radius at the edge R than in the center M.

In the second exemplary embodiment according to FIG. 2, the rotor opposing side 6 which lies opposite the rotor end side 5 is also embodied in a concavely spherical fashion. As can also be clearly seen in the schematical sectional illustration in FIG. 2, the gap width s (cf. FIG. 8) of the gap 8 is larger in the edge region 9 of the rotor end side 5 than at the center M of the rotor end side 5. At the center M of the rotor end side 5, thus in the second exemplary embodiment according to FIG. 2, the width s (cf. FIG. 8) of the gap 8 is minimal and becomes larger towards the edge R of the rotor end side 5. This can for example and preferably be implemented in that the radius of the concavely spherical rotor opposing side 6 is larger, measured at the center M of the rotor end side 5 when the rotor 2 is stationary, than the free axial length l plus the minimal width s of the gap 8, at least compared to the edge region 9 of the rotor end side 5. In other words, in this configuration, the gap 8 has a larger width at the edge R of the rotor end side 5 than at the center M of the rotor end side 5.

However, in the case of the convex-concave pairing of the rotor end side 5 and rotor opposing side 6, it is also possible to provide that when the rotor 2 is stationary, the free rotor end 4 has, when measured from the bearing 3 to the center M of the rotor end side 5, a free axial length l which determines the radius of the convexly spherical embodiment of the rotor end side 5, and in that the concavely spherical rotor opposing side 6 has a radius which, measured at the center M of the rotor end side 5 when the rotor 2 is stationary, is equal to the free axial length l plus the width s (cf. FIG. 8) of the gap 8. This means that in the second exemplary embodiment according to FIG. 2, i.e. also in the case of the convex-concave pairing of the rotor end side 5 and rotor opposing side 6, the gap 8 can have, in a way analogous to the first exemplary embodiment according to FIG. 1, at least substantially a constant width s, as is defined according to FIG. 8. In other words, in the case of the convex-concave pairing of the rotor end side 5 and rotor opposing side 6, the rotor opposing side 6 can also be shaped in a way analogous to the rotor end side 5, with the result that a gap 8 with at least a substantially constant width s (cf. FIG. 8) is formed.

Also in the case of the convex-concave pairing of the rotor end side 5 and rotor opposing side 6 it is possible to refer to a spherical-cap-shaped embodiment of these sides and therefore also of the gap.

In this way, in the case of the configurations and configuration possibilities according to the second exemplary embodiment according to FIG. 2, a free space for the edge R of the rotor end side 5 is also provided in a skillful and simple as well as reliable fashion if the free rotor end 4 experiences deflections about its center of rotation D at the bearing 3 owing to unavoidable imbalance, for example as a result of the formation of deposits and wear during the operation of the rotor 2.

Figure 3:
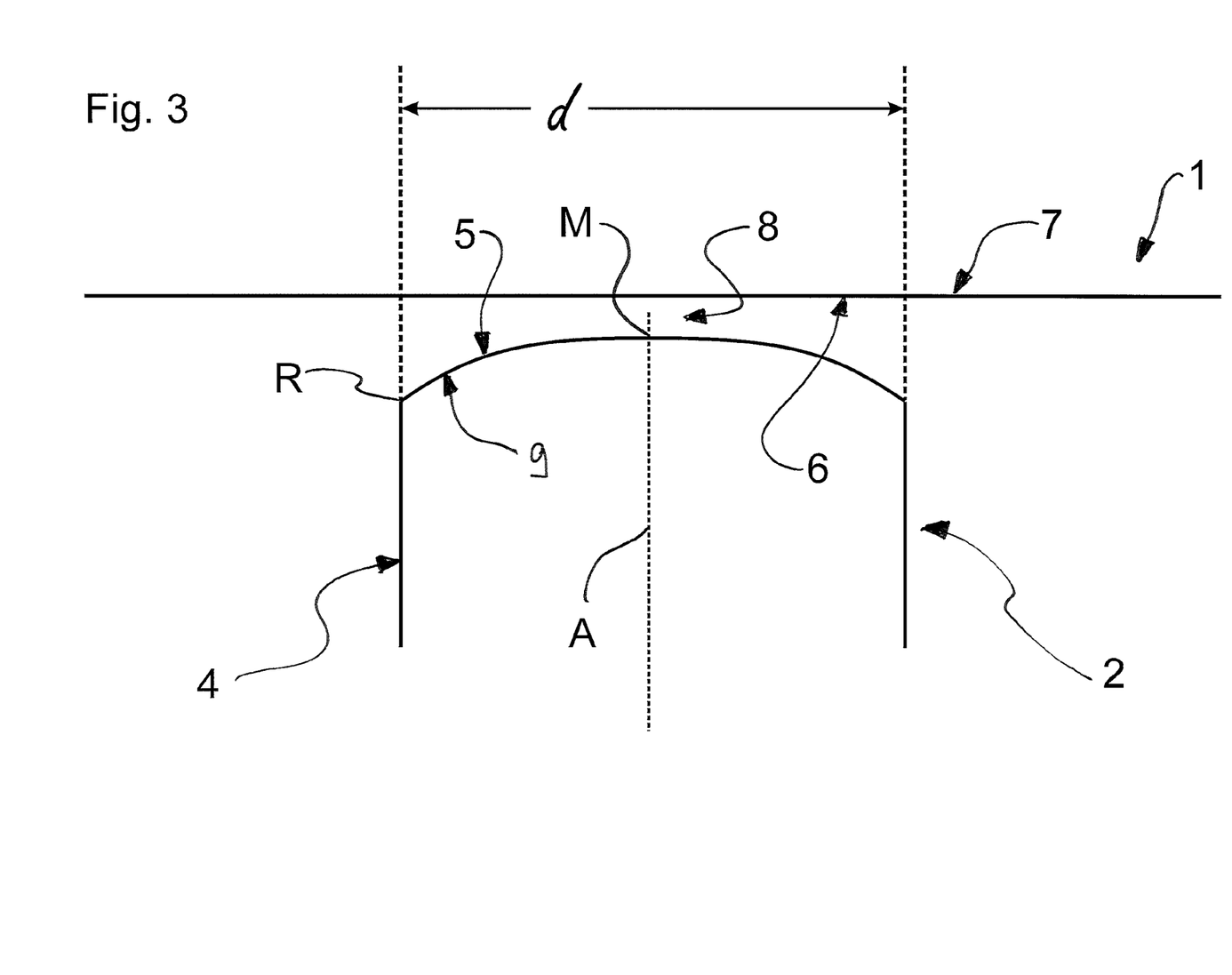
FIG. 3 shows a schematic sectional view of a detail of a third exemplary embodiment of a machine having a cantilever-mounted rotor.

In the third exemplary embodiment of a machine 1, which is shown schematically in section in FIG. 3 and has a cantilever-mounted rotor 2, identical components to the first and second exemplary embodiments according to FIGS. 1 and 2 are provided with the same reference symbols and are, insofar as they are identical, not described once more in relation to FIG. 3 in order to avoid unnecessary repetitions. In this respect, reference is made completely to the descriptions relating to FIGS. 1 and 2, and details of the third exemplary embodiment according to FIG. 3 are explained below only insofar as and to the extent that they differ from the first and second exemplary embodiments according to FIG. 1 or FIG. 2.

In the third exemplary embodiment according to FIG. 3, the configuration of the rotor end side 5 is identical to the configuration of the rotor end side 5 in the first exemplary embodiment according to FIG. 1. However, as can be very well seen in FIG. 3, the rotor opposing side 6 is a planar surface without curved or beveled areas. In contrast to the first exemplary embodiment according to FIG. 1, but analogously to the second exemplary embodiment according to FIG. 2, in this configuration of the third exemplary embodiment according to FIG. 3, the gap 8 has a larger width at the edge R of the rotor end side 5 than at the center M of the rotor end side 5. The width s increases towards the edge R, in particular in the edge region 9 of the rotor end side 5.

Even if FIG. 3 shows, from the rotor end side 5, a shape which firstly runs parallel to the rotor opposing side 6 from the center M of the rotor end side 5 and is curved only in the edge region 9 towards the edge R in the direction towards the bearing 3 (cf. FIG. 8), a convexly spherical rotor end side 5 can also be combined with a rotor opposing side 6 in the form of a planar surface.

In the configurations and configuration possibilities according to the third exemplary embodiment according to FIG. 3, a free space for the edge R of the rotor end side 5 is therefore also provided in a skillful and simple as well as reliable fashion if the free rotor end 4 experiences deflections about its center of rotation D at the bearing 3 owing to unavoidable imbalance, for example as a result of the formation of deposits and wear during the operation of the rotor 2.

Figure 4:
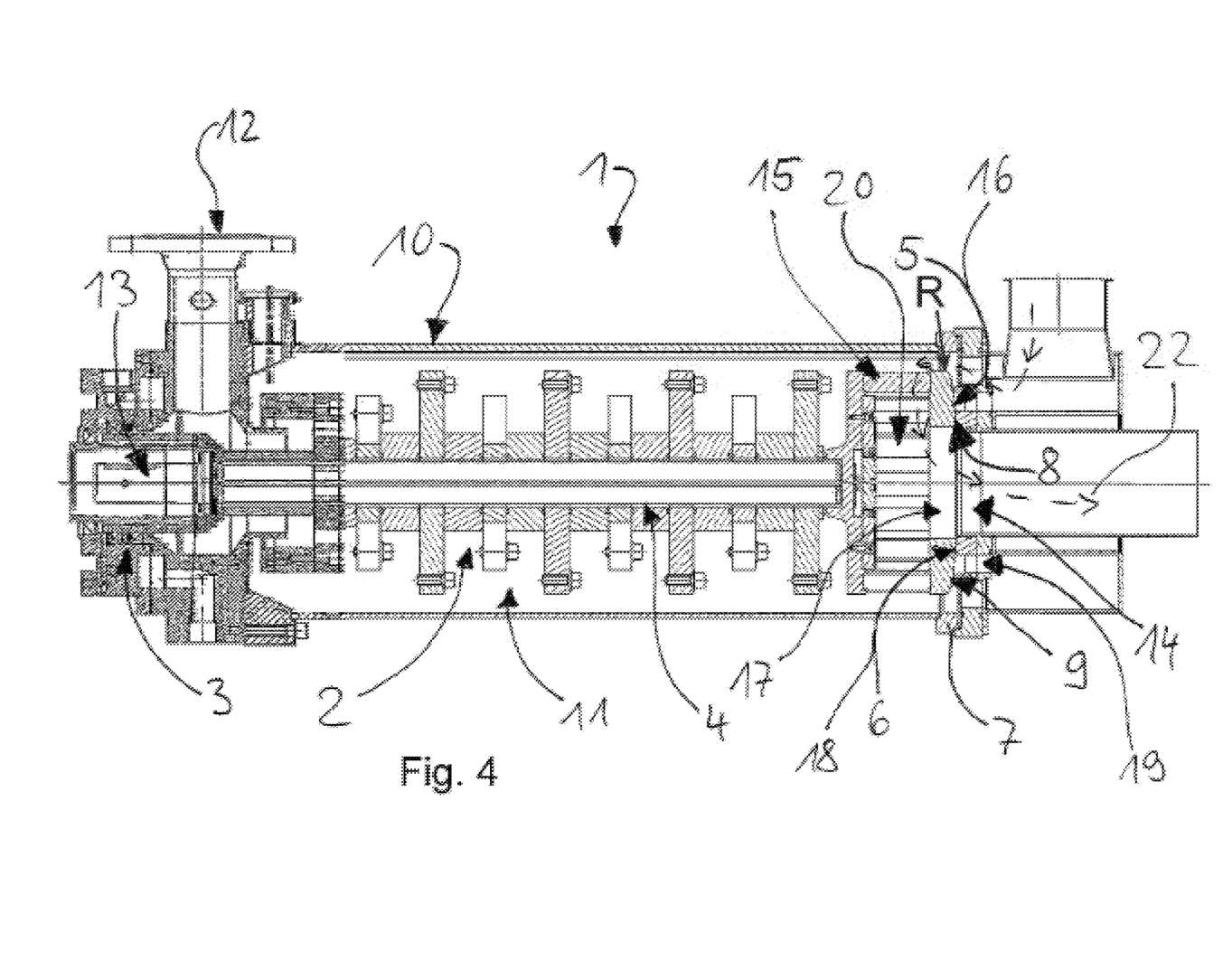
FIG. 4 shows a schematic sectional view of a fourth exemplary embodiment of a machine having a cantilever-mounted rotor.
Figure 5:
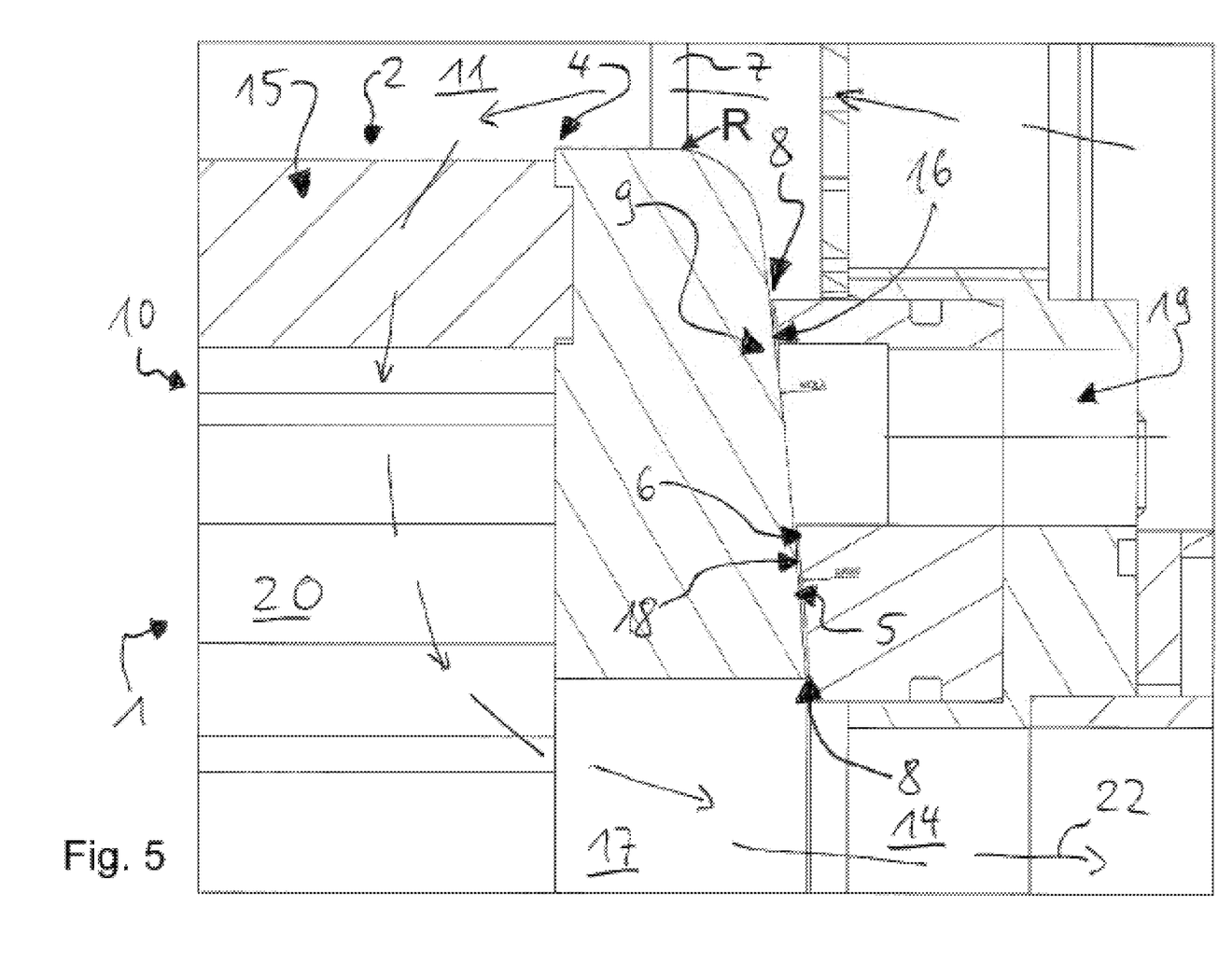
FIG. 5 shows an enlarged schematic sectional view of an essential part of the fourth exemplary embodiment of a machine having a cantilever-mounted rotor from FIG. 4.

All the configurations and variants which are shown and explained in relation to the first, second and third exemplary embodiments according to FIGS. 1 to 3 can be implemented in the machine 1 of the fourth exemplary embodiment according to FIGS. 4 and 5 even if a further pairing of forms of the rotor end side 5 and of the rotor opposing side 6 has been selected here for purposes of illustration.

In the fourth exemplary embodiment of a machine 1 which is shown schematically in FIGS. 4 and 5 and has a cantilever-mounted rotor 2, identical components to those in the first to third exemplary embodiments according to FIGS. 1 to 3 are provided with the same reference symbols and are, insofar as they are identical, not described once more in relation to FIGS. 4 and 5 in order to avoid unnecessary repetitions. In this respect, reference is made completely to the descriptions relating to FIGS. 1 to 3, and details of the fourth exemplary embodiment according to FIGS. 4 and 5 are explained below only insofar as and to the extent that they differ from the first to third exemplary embodiments according to FIGS. 1 to 3.

In the machine 1 according to the fourth exemplary embodiment, which is shown in FIGS. 4 and 5 and explained below, the machine is a mill and, to be more precise, an agitator bead mill 10. In the housing or stator 7 of the agitator bead mill 10, a rotor 2 is mounted on a bearing 3 in a cantilevered fashion which forms a center of rotation D about which the free rotor end 4 of the rotor 2 experiences deflections owing to unavoidable imbalance, for example as a result of the formation of deposits and wear, during the operation of the agitator bead mill 10 when the rotor 2 rotates.

The rotor opposing side 6 is a component of the housing 7 which surrounds a processing space 11 in which the free rotor end 4 of the rotor 2 is arranged. In the customary fashion, the agitator bead mill 10 contains a ground material inlet 12 as well as drive devices 13 for rotationally driving the rotor 2, wherein the drive devices 13 are located on the other side of the bearing 3, facing away from the free rotor end 4. Details will not be given here on mills and, in particular, agitator bead mills in relation to the milling process since it is assumed that a person skilled in the art is aware of these details for various mill configurations and operating variants, and since such details of which relate to the grinding do not contribute to the present invention.

For exemplary embodiments of the present invention, such as the fourth exemplary embodiment according to FIGS. 4 and 5, it is also relevant that the rotor opposing side 6 has a material outlet opening 14 opposite the rotor end side 5, and the gap 8 is a sealing gap between the rotor end side 5 and the rotor opposing side 6 in the surroundings of the material outlet opening 12. Furthermore, affected by the measures of the present invention is that the rotor 2 contains a separating device 15, in particular a grinding-body separating device. The separating device 15 is located at the free end of the free rotor end 4 and contains the rotor end side 5 which closes off the separating device 15 from the rotor end side 6 of the housing 7 with the material outlet opening 14.

As can be seen from the illustrations of the fourth exemplary embodiment in FIGS. 4 and 5, the rotor end side 5 is formed by an end annular surface 16 which surrounds an end passage opening 17 of the separating device 15. In a way analogous to the end annular surface 16 of the rotor end side 5, the rotor opposing side 6 has an opposing annular surface 18 which surrounds the material outlet opening 14 in the rotor opposing side 6. The end annular surface 16 is a frusto-conical surface with the smaller circumference facing the rotor opposing side 6, which is, as the opposing annular surface 18, a frusto-conical surface which has at least essentially the same shape as the end annular surface 16, with the result that the gap 8 is formed between the annular end surface 16 of the rotor end side 5 and the opposing annular surface 18 of the rotor opposing side 6.

In addition, in FIGS. 4 and 5 it is shown for the fourth exemplary embodiment that devices 19 for rinsing or purging the gap 8, which is a sealing gap in the fourth exemplary embodiment, with a gaseous fluid are included.

The separating device 15 can be formed or supplemented by a bladed rotor body (not shown).

The configuration of the fourth exemplary embodiment according to FIGS. 4 and 5 also permits, in a skillful and easy as well as reliable fashion, a free space for the edge R of the rotor end side 5 if the free rotor end 4 experiences deflections about its center of rotation D at the bearing 3 owing to unavoidable imbalance, for example as a result of the formation of deposits and wear during the operation of the rotor 2.

In addition, it is advantageous and therefore preferred if a rotor end body which contains the rotor end side 5 and is formed, for example, by the separating device 15 or a bladed rotor body contains a discharge space 20 which is free of installations, that is, unobstructed.

Instead of a mill, the machine can also be an air classifier in which the rotor contains a bladed classifier wheel which is formed or arranged at the free rotor end and contains the rotor end side. The general configurations of an air classifier and the inventive specifications thereof are readily possible for a person skilled in the art on the basis of the above explanations of the first to fourth exemplary embodiments, and separate explanations by means of graphic illustrations and corresponding descriptions are therefore omitted. By analogy with the mill, in the case of the air classifier, a rotor end body, which contains the rotor end side and is formed by the bladed classifier wheel, can advantageously, and therefore preferably, also contain a discharge space which is free of installations.

It is preferred if, when the rotor is stationary, the gap 8 has, measured at least at the center M of the rotor end side 5, a width of less than or equal to 1 mm, in particular of less than or equal to 0.5 mm.

Figure 6:
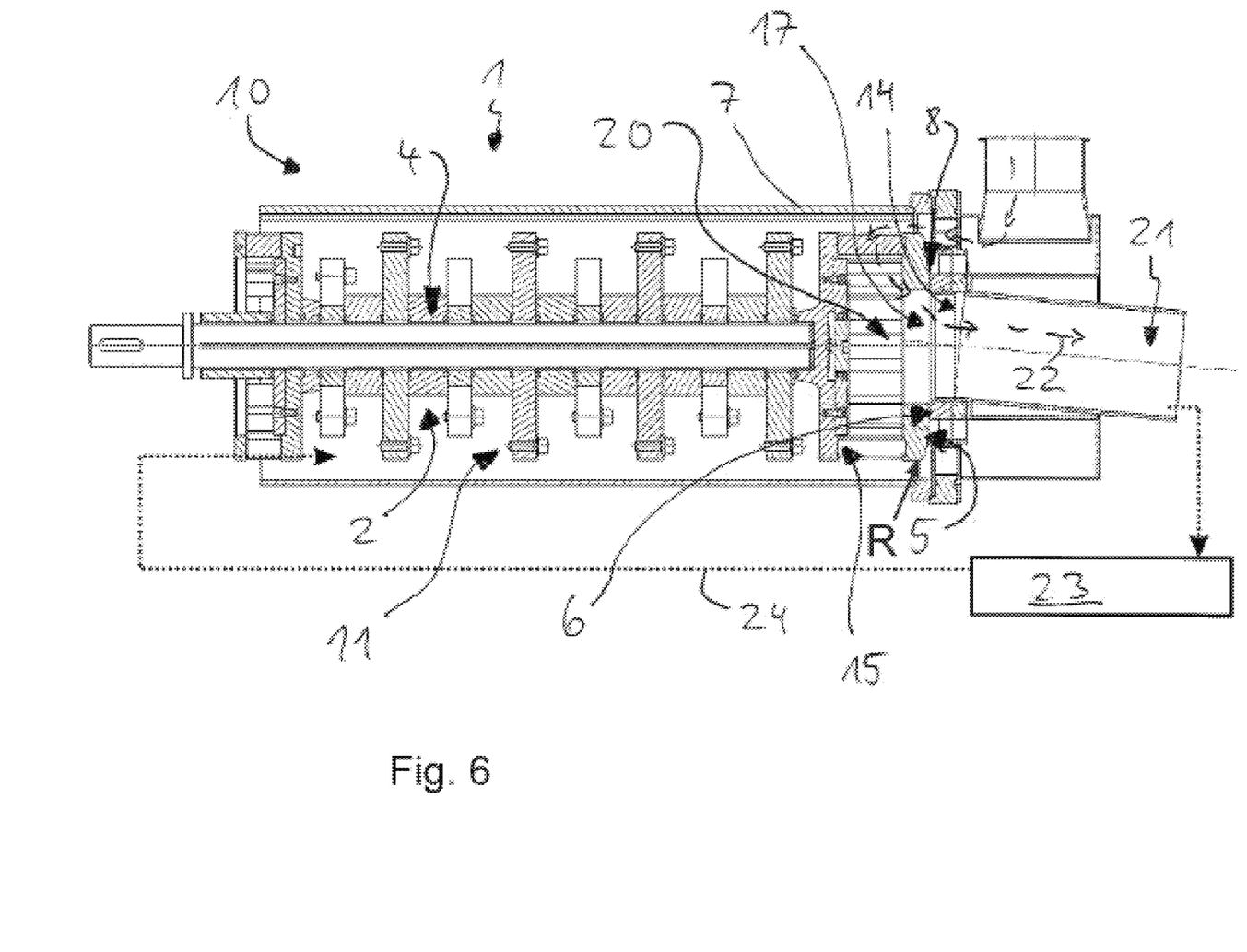
FIG. 6 shows a schematic sectional view of a fifth exemplary embodiment of a machine having a cantilever-mounted rotor.
Figure 7:
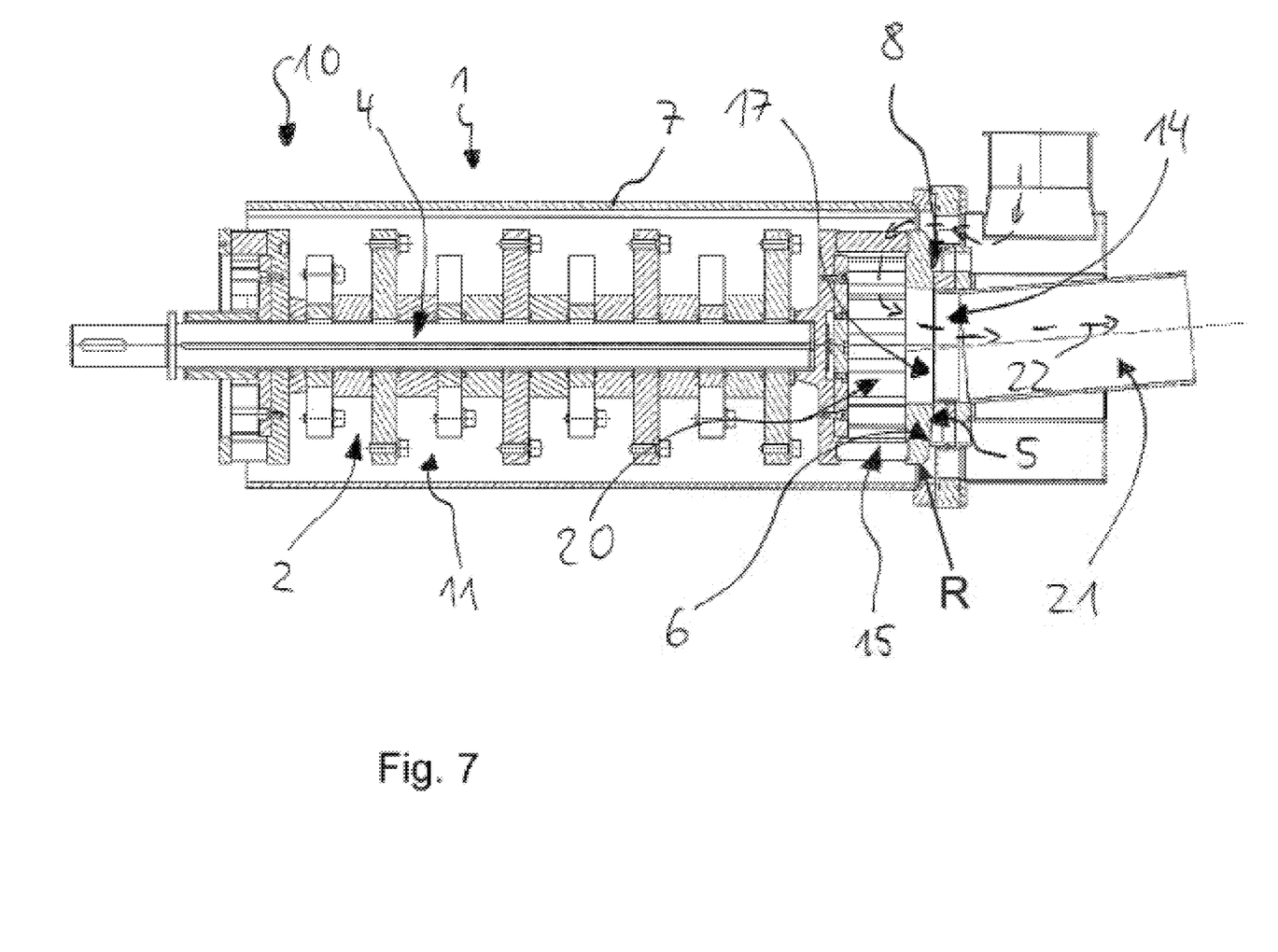
FIG. 7 shows a schematic sectional view of a sixth exemplary embodiment of a machine having a cantilever-mounted rotor.

FIGS. 6 and 7 also show two exemplary embodiments which are of still further aspects.

In the case of the fifth and sixth exemplary embodiments of a machine 1 which are shown schematically in FIGS. 6 and 7 and which have a cantilever-mounted rotor 2, components which are the same as in the first to fourth exemplary embodiments according to FIGS. 1 to 5 are provided with the same reference symbols and are, insofar as they are identical, not described once more in relation to FIGS. 6 and 7 in order to avoid unnecessary repetitions. In this respect, reference is made completely to the descriptions relating to FIGS. 1 to 5, and details of the fifth and sixth exemplary embodiments according to FIGS. 6 and 7 are only explained below insofar as and to the extent that they differ from the first to fourth exemplary embodiments according to FIGS. 1 to 5.

The agitator bead mill 10 as an example of a machine 1 in the fifth exemplary embodiment according to FIG. 6 has, like the agitator bead mill 10 of the fourth exemplary embodiment according to FIGS. 4 and 5, a rotor end body which contains the rotor end side 5 and is formed by the separating device 15, and contains a discharge space 20 which is free of installations. In addition, a discharge gas flows through the discharge space 20, as is symbolized by the arrows 22. In addition, the discharge space 20 opens through the material outlet opening 14 into a discharge connector 21 for ground material, which connector is inclined downward with respect to the horizontal by 2° to 15°, preferably 3° to 10°, particularly preferably 4° to 6°.

The background is that during the starting up and running down of the agitator bead mill 10, grinding bodies (not shown) can pass into the interior of the discharge space 20 in the grinding-body separating device or generally separating device 15 owing to a lack of centrifugal forces. These grinding bodies (not shown) are directed with the discharge gas from the interior of the discharge space 20 through the material outlet opening 14 into the discharge connector 21 from where they pass downward, because of the inclination of the discharge connector 21, into a grinding body trap 23 from where they are returned into the processing space 11, as symbolized by the dashed line 24.

The difference between the sixth exemplary embodiment according to FIG. 7 with respect to the fifth exemplary embodiment according to FIG. 6 is that in the case of the sixth exemplary embodiment according to FIG. 7, the discharge connector 21 for ground material is inclined upward instead of downward with respect to the horizontal by 2° to 15°, preferably 3° to 10°, particularly preferably 4° to 6°. As a result, a grinding body trap 23 and a return over a distance according to the dashed line can be omitted since the grinding bodies (not shown) which have possibly passed into the discharge connector 21 which is inclined upward roll back into the discharge space during the running down of the agitator bead mill 10, from which discharge space 20 they are again fed back automatically by the centrifugal force into the processing space 11 when the agitator bead mill 10 is started up again.

The invention is illustrated merely by way of example by means of the exemplary embodiments in the description and in the drawing and is not restricted thereto but rather comprises all the variations, modifications, substitutions and combinations which a person skilled in the art can infer from the present documents, in particular within the scope of the claims and the general illustrations in the introduction of this description as well as the description of the exemplary embodiments, and a person skilled in the art can combine them with his specialist knowledge and the prior art. In particular, all the individual features and configuration variations of the invention can be combined.

The invention claimed is:

1. A machine comprising:
a stator; and
a rotor that is rotatable around a central axis and has a first end and an opposite second end, the first end of the rotor being mounted to a bearing and the second end of the rotor being non-mounted in a cantilevered fashion,
the second end of the rotor having an end side surface,
the end side surface having a center intersected by the central axis when the rotor is stationary,
wherein the end side surface positioned adjacent to an opposing side surface of the stator to form a sealing gap therebetween, and
wherein the end side surface being curved or beveled in an edge region providing a free space between the end side surface and the opposing side surface of the stator for the edge region of the end side surface when the second end of the rotor experiences deflection with respect to the central axis during operation of the machine.

2. The machine according to claim 1, wherein the opposing side surface of the stator is a component of a housing.

3. The machine according to claim 1, wherein the opposing side surface of the stator contains a material outlet opening opposite the end side surface of the second end of the rotor.

4. The machine according to claim 1, wherein the end side surface of the second end of the rotor is embodied in the form of a frustum, cone or spherical cap.

5. The machine according to claim 1, wherein the opposing side surface of the stator is shaped analogous to the end side surface of the second end of the rotor, the sealing gap having at least a constant width even when the second end of the rotor is deflected with respect to the center axis during operation of the machine when the rotor is rotating.

6. The machine according to claim 1, wherein when the rotor is stationary the sealing gap has a greater width at an outer edge of the end side surface of the second end of the rotor than at a center point of the end side surface of the second end of the rotor.

7. The machine according to claim 1, wherein the end side surface of the second end of the rotor is convexly spherical,
when the rotor is stationary, the second end of the rotor has a free axial length measured from the bearing up to a center point of the end side surface of the second end of the rotor, and
the end side surface of the second end of the rotor has a radius which is equal to the free axial length of the second end of the rotor.

8. The machine according to claim 7, wherein the opposing side surface of the stator lying opposite the end side surface of the second end of the rotor is concavely spherical.

9. The machine according to claim 8, wherein
the concavely spherical opposing side surface of the stator has a radius which, measured at a center of the end side surface of the second end of the rotor when the rotor is stationary, is equal to the free axial length plus a width of the sealing gap.

10. The machine according to claim 1, wherein
the end side surface of the second end of the rotor is convexly spherical, and
the convexly spherical end side surface of the second end of the rotor has a smaller radius at an outer edge of the end side surface of the second end of the rotor than at a center point of end side surface of the second end of the rotor.

11. The machine according to claim 1, for use as an air classifier, wherein
the rotor contains a bladed classifier wheel, and
the bladed classifier wheel is formed or arranged at the second end of the rotor and contains the end side surface of the second end of the rotor.

12. The machine according to claim 11, wherein the bladed classifier wheel contains a discharge space which is unobstructed.

13. The machine according to claim 1, for use as a mill, wherein
the rotor contains as a rotor end body, a grinding-body separating device or a bladed rotor body, and
the grinding-body separating device or the bladed rotor body is formed or arranged at the second end of the rotor and contains the end side surface of the second end of the rotor.

14. The machine according to claim 13, wherein
the grinding-body separating device or the bladed rotor body contains a discharge space through which a discharge gas flows, and which opens through a material outlet opening into a discharge connector for ground material, which discharge connector is inclined upwards or downwards with respect to the horizontal by 2° to 15°.

15. The machine according to claim 1, wherein when the rotor is stationary the sealing gap has, when measured at a center of the end side surface of the second end of the rotor, a width of less than or equal to 1 mm.

16. A machine comprising:
a stator; and
a rotor that is rotatable around a central axis and has a first end and an opposite second end, the first end of the rotor being mounted to a bearing and the second end of the rotor being non-mounted in a cantilevered fashion,
the second end of the rotor having an end side surface,
the end side surface being annular around a center intersected by the central axis when the rotor is stationary,
wherein the end side surface positioned adjacent to an opposing side surface of the stator to form a sealing gap therebetween, and
wherein the end side surface having a frusto-conical surface shape providing between the end side surface and the opposing side surface of the stator for an edge region of the end side surface when the second end of the rotor experiences deflection with respect to the central axis during operation of the machine.

* * * * *